US010485365B1

(12) United States Patent
van Dalen

(10) Patent No.: US 10,485,365 B1
(45) Date of Patent: Nov. 26, 2019

(54) SINGLE-HANDED LOCKING TONGS

(71) Applicant: Big Sky Product Innovation, LLC, Dillon, MT (US)

(72) Inventor: Eric John van Dalen, Dillon, MT (US)

(73) Assignee: Big Sky Product Innovation, LLC, Dillon, MT (US)

( * ) Notice: Subject to any disclaimer, the term of this patent is extended or adjusted under 35 U.S.C. 154(b) by 0 days.

(21) Appl. No.: 16/273,453

(22) Filed: Feb. 12, 2019

(51) Int. Cl.
*A47G 21/10* (2006.01)
(52) U.S. Cl.
CPC .................................. *A47G 21/10* (2013.01)
(58) Field of Classification Search
CPC ......... A47G 21/10; A47J 43/283; A47J 45/10; B25B 9/02; A45D 26/0066
USPC ........................................................ 294/99.2
See application file for complete search history.

(56) References Cited

U.S. PATENT DOCUMENTS

| | | | |
|---|---|---|---|
| 1,106,518 A | 8/1914 | Matti | |
| 2,864,645 A | 12/1958 | Medrum | |
| 5,199,756 A | 4/1993 | Bartlett et al. | |
| 6,089,631 A | 7/2000 | Thurlow et al. | |
| 6,869,117 B1 | 3/2005 | Blum | |
| 7,086,676 B2 | 8/2006 | Sumter et al. | |
| 7,261,348 B1 | 8/2007 | Fried | |
| 7,316,434 B1 | 1/2008 | Kerr | |
| 7,448,660 B2 | 11/2008 | Yamanaka et al. | |
| 7,637,547 B2 | 12/2009 | Schneider | |
| 8,061,749 B2 | 11/2011 | Risch et al. | |
| 8,308,208 B1* | 11/2012 | Blum | A47J 43/283 294/106 |
| 8,714,606 B2* | 5/2014 | Schoeman | A47G 21/10 294/106 |
| 8,828,047 B2* | 9/2014 | Bissinger | A61B 17/30 606/206 |
| 9,254,065 B2* | 2/2016 | Floyd | A47J 43/283 |
| 9,468,322 B2* | 10/2016 | Woo | A47G 21/103 |
| 2002/0106609 A1* | 8/2002 | Palermo | A61C 3/10 433/159 |
| 2002/0127514 A1* | 9/2002 | Dietrich | A61C 3/10 433/159 |
| 2013/0049386 A1 | 2/2013 | Lv | |

FOREIGN PATENT DOCUMENTS

FR 1251207 A * 1/1961 ............ A47J 43/283

* cited by examiner

*Primary Examiner* — Stephen A Vu
(74) *Attorney, Agent, or Firm* — Loomis, Ewert, Parsley, Davis & Gotting P.C.; Mikhail Murshak

(57) ABSTRACT

Locking tongs that are operable to lock in a closed position and unlock to an open position with the use of one hand. The tongs include a first arm and a second arm connected at a pivot point and extend out from each other in an open position. A tension spring positioned at the pivot point holds the first and second arm in the open position. A locking mechanism includes: (i) a locking member having an elongated body and forms a stop at an end, the locking member positioned on an inner portion of the first arm and extends towards the second arm, and (ii) a receiving aperture defined on the second arm sized and shaped to receive the stop of the locking member. The locking member engages the second arm when the stop passes through the receiving aperture and thereby holds the pair of tongs in a closed position.

16 Claims, 4 Drawing Sheets

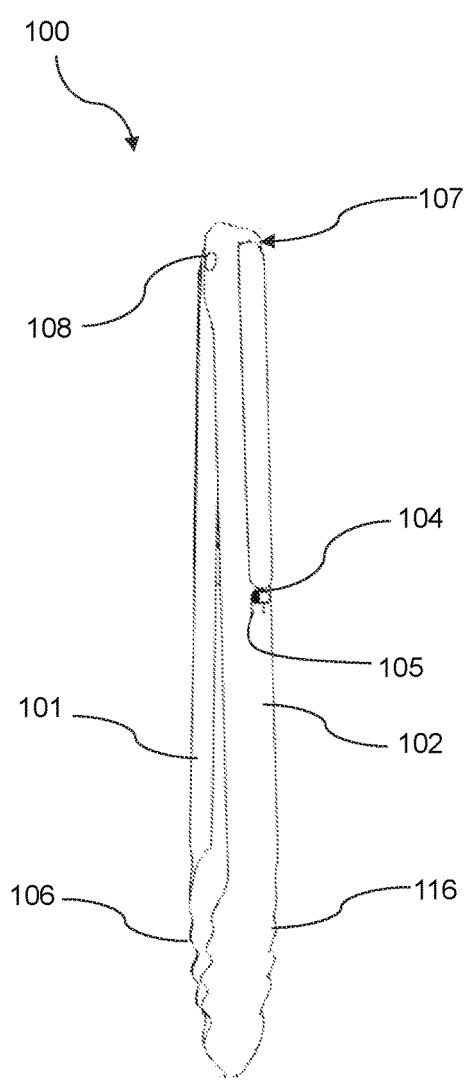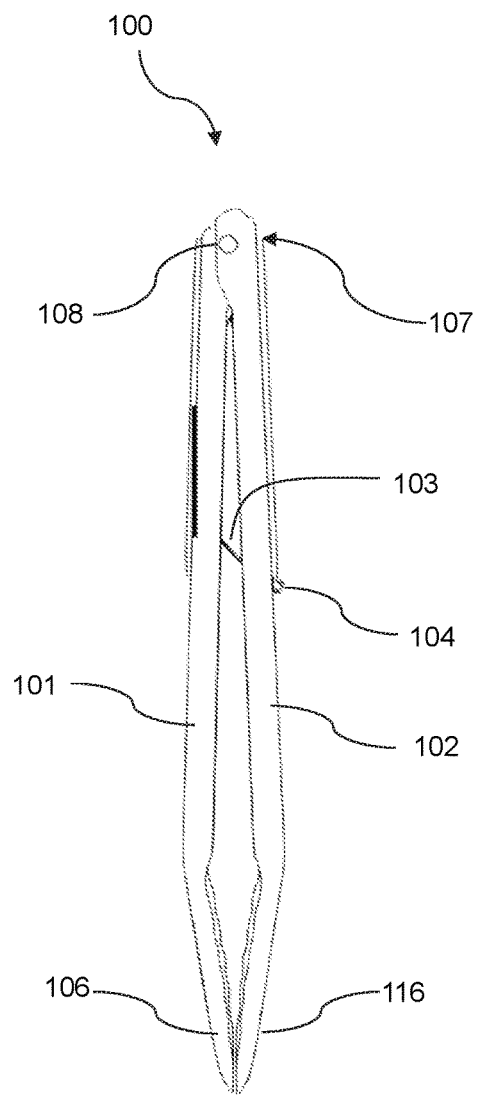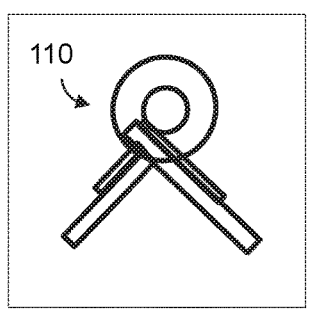
FIG. 2A
FIG. 2B
FIG. 1B

SINGLE-HANDED LOCKING TONGS

TECHNICAL FIELD

The present disclosure relates generally to the field of culinary utensils and more specifically relates to tongs having a locking feature.

DESCRIPTION OF RELATED ART

Tongs, also interchangeably referred to as a "pair of tongs", are valuable culinary tools that are utilized in a variety of different fashions. Tongs can be used, among many other things, to grab, manipulate, and pick up pieces of food, toss a salad, and assist with grilling. Most tongs include a pair of tong arms connected at one point and extending out and away from each other defining an acute angle. The tongs can be biased in the open position with the tong arms spaced at a maximum angle, typically less than 90 degrees. The biased, open position of the tongs occupies a great deal of valuable space in the kitchen drawer and/or dish washer and can complicate the cleaning of the utensil.

Some tongs include a locking mechanism that allows them to be secured in a closed position such that the tong arms are held together side by side. These locking tongs lock the tong arms in the closed position so as to occupy as little space as possible when storing the utensil. In some examples, locking tongs are able to grab a piece of food and hold the food in a locked position without requiring continued pressure from the user arm. Example locking tongs include some sort of locking mechanism located at the connection point that requires the utilization of two hands, or a magnetic attraction of the two tong arms, or the inversion of the tongs so as to engage the locking mechanism.

U.S. Pat. No. 1,106,518 to Matti discloses a locking mechanism for tongs or forceps wherein one arm of the tongs or forceps is provided with an elongated slot through which passes a sliding member fitted with a handle or finger piece, and carrying a spring that controls the action of a hook member, adapted to be engaged with or disengaged from a multiple hook or ratchet on the other arm.

U.S. Pat. No. 2,864,645 to Meldrum discloses a pair of tongs having a locking means which may, as desired, function automatically to lock the gong arms together. This structure may, if desired, operate by gravity so that if the tongs are held in an upright position with their pivoted ends extending downwardly, the tong arms will lock together when pressed together. The tong arms may be unlocked at any time by merely holding the hinged ends of the tong arms upwardly and applying a slide pressure tending to urge the arms together and to release the locking means. The locking means is positioned at the pivoting connection point of the tong arms.

U.S. Pat. No. 5,199,756 to Bartlett et al. discloses a pair of locking tongs for grasping items which includes two arms, each with a hinge end and a grasping end. A hinge pin is provided for pivotally connecting the two arms together at their hinge ends so that the arms can pivot between an open and closed position. A locking plate is provided for locking the arms in the closed position slidably disposed at the hinge ends of the arms. The locking plate is movable from a first unlocked position to a second locked position whereby the locking plate engages the hinged ends of the arms and prevents the arms from opening.

U.S. Pat. No. 6,869,117 to Blum discloses tongs having a pair of arms hinged at one end. A spring biases the grasping ends apart. When the arms are closed, magnetic elements on the inner surfaces or sides of the arms hold the arms together closed and locked. To unlock the arms, a finger or thumb of the holding hand is inserted between the arms, forcing the magnetic elements apart enough to release their hold. A mechanism is provided for inactivating the magnetic lock mechanism when desired.

U.S. Pat. No. 7,637,547 to Schneider discloses a pair of serving tongs having two tong arms which are connected to each other in a manner such that they can pivot relative to each other about a pivot axis and are designed at their front ends for grasping food products, a spring in order to prestress the tong arms into an open position of the pair of serving tongs, and a locking mechanism in order to lock the tong arms counter to the prestress of the spring in a closed position of the pair of serving tongs. The first tong arm includes an elongated hole in which a locking pin is moveably guided, and a locking cam is provided on the second tong arm and, in the locked closed position of the pair of serving tongs, comes into contact with the locking pin. A locking and an unlocking of the tong arms takes place here by simply pivoting the pair of serving tongs into a vertical position with the tong arms close to each other. Furthermore, the locking mechanism is arranged behind the pivot axis of the tong arms, as viewed from a front end of the tong arms.

U.S. Pat. No. 8,714,606 to Schoeman discloses a locking tong that includes a first and second elongated arm pivotably coupled near the proximal end portions thereof with a biasing member inserted there between urging the arms apart, wherein at least one arm has an enlarged distal end portion sized and shaped for manipulating food thereby defining a head. A claw is pivotably coupled to the first arm near the proximal end portion of the claw about an axis in substantially orthogonal relation to the long axis of the arm, and the distal end portion of the claw has a hook disposed thereupon. There is an engagement portion disposed upon the second arm sized and shaped to releasably retain the hook therein, such that the latch is engageable upon the clasp. The arms are releasably retained in a closed position.

U.S. Published App. No. 2013/0049386 to Bing discloses a locking arrangement having a first member and a second member, each having a front end and a rear end and with the first member and the second member connected together at a first pivot axis, a front portion, a rear portion and a locking mechanism. The locking mechanism includes a lever and a guide. The arrangement is configured to assume one of two configurations in that in a first configuration the lever is engaged in a first position due to orientation of the arrangement such that the first arm and the second arm are locked against each other, or in a second configuration in which the lever having been disengaged from the first position, or engaging or engaged in the second position, due to orientation of the apparatus such that the first arm and the second arm are movable relative to each other.

These examples are representative of locking tongs. However, none of the above, taken either alone or in combination achieve the benefits or describe the features of the present disclosure.

SUMMARY

The present disclosure provides for tongs having a locking mechanism, the tongs include: (a) a first tong arm and a second tong arm, each of the first and second tong arms having a hinge end and a grasping end, wherein the first and second tong arms are connected at the hinge ends forming a pivot point to allow the first and second tong arms to pivot between an open position and a closed position; (b) a tension spring loaded at the pivot point causing the first and second tong arms to extend out and away from each other in the open position; and (c) a locking mechanism comprising an elongated locking member extending from an inner portion of the first tong arm to engage an aperture formed on the second tong arm. The elongated member engages with the aperture when the first and second tong arms are in a closed position and holds the first and second tong arms in a locked closed position. The tong arms are operable to pivot about the pivot point to the open position by manually releasing the elongated locking member from the aperture. The elongated locking member includes an elongated body and a stop positioned at a disconnected end of the elongated body. The stop is operable for passing through the aperture and abutting and holding an outer surface of the second tong arm thereby holding the tong arms in the closed position.

In an example, the stop includes a metal loop end sized and shaped to engage the outer surface of the second tong arm through the aperture and lock the tong arms in the closed position. In another example, the stop includes a ball-point end sized and shaped to engage the outer surface of the second tong arm through the aperture and lock the tong arms in the closed position. The elongated body can extend at an acute angle from the inner surface of the first tong arm towards the grasping end of the second tong arm resulting in a locking tension against the second tong arm when engaged through the aperture. In yet another example, the first tong arm defines a length extending from the hinge end to the grasping end, and the elongated locking member is mounted on the inner surface of the first tong arm at a position that is greater than a third of the length of the first tong arm but less than half the length of first tong arm. In even yet another example, the elongated locking member is mounted on the inner surface of the first tong arm at a position halfway between the hinge end and the grasping end of the first tong arm.

The grasping end of the first tong arm and the grasping end of the second tong arm can define identical members selected from the group consisting of spoons, forks, sporks, serrated members, loops, and forceps. In another example, the grasping end of the first tong arm and the grasping end of the second tong arm are non-identical members selected from the group consisting of a spoon, a fork, a spork, a serrated member, a loop, and a forcep. The tong arms can be fabricated from metal. In yet still another example, each tong arm further includes a gripping feature formed on an outer surface of the tong arms.

The present disclosure provides for a pair of tongs including: (a) a first arm and a second arm connected at a pivot point, the first and second arms extending out and away from each other in an open position defining an acute angle there between; (b) a first grasping member positioned at a distal end of the first arm and a second grasping member positioned at a distal end of the second arm, wherein the first and second grasping members are operable for grasping food when squeezed together; (c) a tension spring positioned at the pivot point holding the first and second arm in an open position; and (d) a locking mechanism having: (i) a locking member formed of an elongated body and forming a stop at an end, the locking member positioned on an inner portion of the first arm and extending at an angle towards the second arm, and (ii) a receiving aperture defined on the second arm sized and shaped to receive the stop of the locking member. The locking member is operable to engage the second arm when the stop passes through the receiving aperture and thereby holds the pair of tongs in a closed position. The locking mechanism is operable to allow the pair of tongs to open by releasing the locking member from the receiving aperture. The arms are operable to pivot about the pivot point to the open position by manually releasing the elongated locking member from the aperture. The stop is positioned at a disconnected end of the elongated body. The stop is operable for passing through the aperture and abutting and holding an outer surface of the second arm thereby holding the arms in the closed position. In an example, the stop includes a metal loop end sized and shaped to engage the outer surface of the second arm through the aperture and lock the tong arms in the closed position. In another example, the stop includes a ball-point end sized and shaped to engage the outer surface of the second arm through the aperture and lock the arms in the closed position. The elongated body can extend at an angle from the inner surface of the first arm towards the distal end of the second arm thereby forming a locking tension against the second arm when engaged through the aperture.

The present disclosure further provides for a method of locking and unlocking a pair of tongs, the method includes the steps of: (a) providing a pair of tongs having: (i) a first arm and a second arm connected at a pivot point and biased by a tension spring to hold the first and second arms extending out and away from each other in an open position, the open position defining an acute angle there between; and (ii) a locking mechanism including a locking member having an elongated body and forming a stop at a disconnected end, the locking member positioned on an inner portion of the first arm and extending at an angle towards the second arm, and a receiving aperture defined on the second arm sized and shaped to receive the stop of the locking member; (b) squeezing the first arm and the second arm together until the locking member engages the second arm by passing the stop through the receiving aperture of the second arm; and (c) abutting the stop against a surface of the second arm thereby holding the pair of tongs in a closed and locked position; wherein the locking mechanism is operable to allow the pair of tongs to open by releasing the locking member from the receiving aperture. The tong arms can be unlocked by manually disengaging the locking member from the receiving aperture.

For purposes of summarizing the disclosure, certain aspects, advantages, and novel features of the disclosure have been described herein. It is to be understood that not necessarily all such advantages may be achieved in accordance with any one particular embodiment of the disclosure. Thus, the disclosure may be embodied or carried out in a manner that achieves or optimizes one advantage or group of advantages as taught herein without necessarily achieving other advantages as may be taught or suggested herein. The features of the disclosure which are believed to be novel are particularly pointed out and distinctly claimed in the concluding portion of the specification. These and other features, aspects, and advantages of the present disclosure will become better understood with reference to the following drawings and detailed description.

BRIEF DESCRIPTION OF THE DRAWINGS

The figures which accompany the written portion of this specification illustrate example embodiments and methods of use for the present disclosure.

FIG. 1B illustrates a schematic of a tension spring operable to bias the tongs in an open position.

FIGS. 2A and 2B show perspective and side views, respectively, of the locking tongs of FIG. 1A disposed in the locked and closed position according to an embodiment of the present disclosure.

The various embodiments of the present disclosure will hereinafter be described in conjunction with the appended drawings, wherein like designations denote like elements.

DETAILED DESCRIPTION

As discussed above, embodiments of the present disclosure relate to tongs or a "pair of tongs" and more particularly to tongs that may be locked in the closed position with the use of a single hand.

Tongs can be used as a kitchen utensil to grasp food items of a variety of shapes and sizes. Tongs generally include two tong arms that are connected at a lower, hinge end of each arm by a connection feature. The tongs can be held together by a pin located at the hinge which forms a pivot point. A tension spring is positioned at the pivot point that biases the two tong arms in an open position. When pressure is applied to an outside surface of the two tong arms, the two tong arms pivot towards each other about a pivot point formed at the pivot point to the closed position.

Each tong arm includes a grasping end. The grasping end of the arms consists of a grasping head or grasping member. In an example, the grasping member can be wider than the arm itself. In another example, the grasping member defines a shape of a common utensil such as a serrated member forming curved sections along an outer perimeter of a spoon-like structure, a spoon, a fork having two or more prongs, forceps, and/or a spork. The grasping heads can be fashioned in a waved form so as to better grasp small food items. Generally, when no pressure is applied to the tongs, the spring engages so as to spread the arms in the open position.

The present disclosure provides a locking mechanism to lock the tong arms in the closed position. This can provide the benefit of ease of washing of the tongs and for reduction of space when storing the tongs. The locking mechanism can be engaged and disengaged with the use of only one hand. The locking mechanism includes an elongated locking member located on an inner surface of the first tong arm and extends outwardly towards the second tong arm. This forms a disconnected end. The locking member is operable to engage a receiving aperture located on the second tong arm. The locking member includes a stop at the disconnected end that is sized and shaped to pass through the receiving aperture and abut against a surface of the second arm. When the locking member engages with the receiving aperture, the tong arms are locked in the closed position. To release the tong arms from the closed position, pressure is applied to the disconnected end of the elongated member in which the elongated member will release from the aperture, and the tongs will be returned to the biased open position.

Figure 1A:
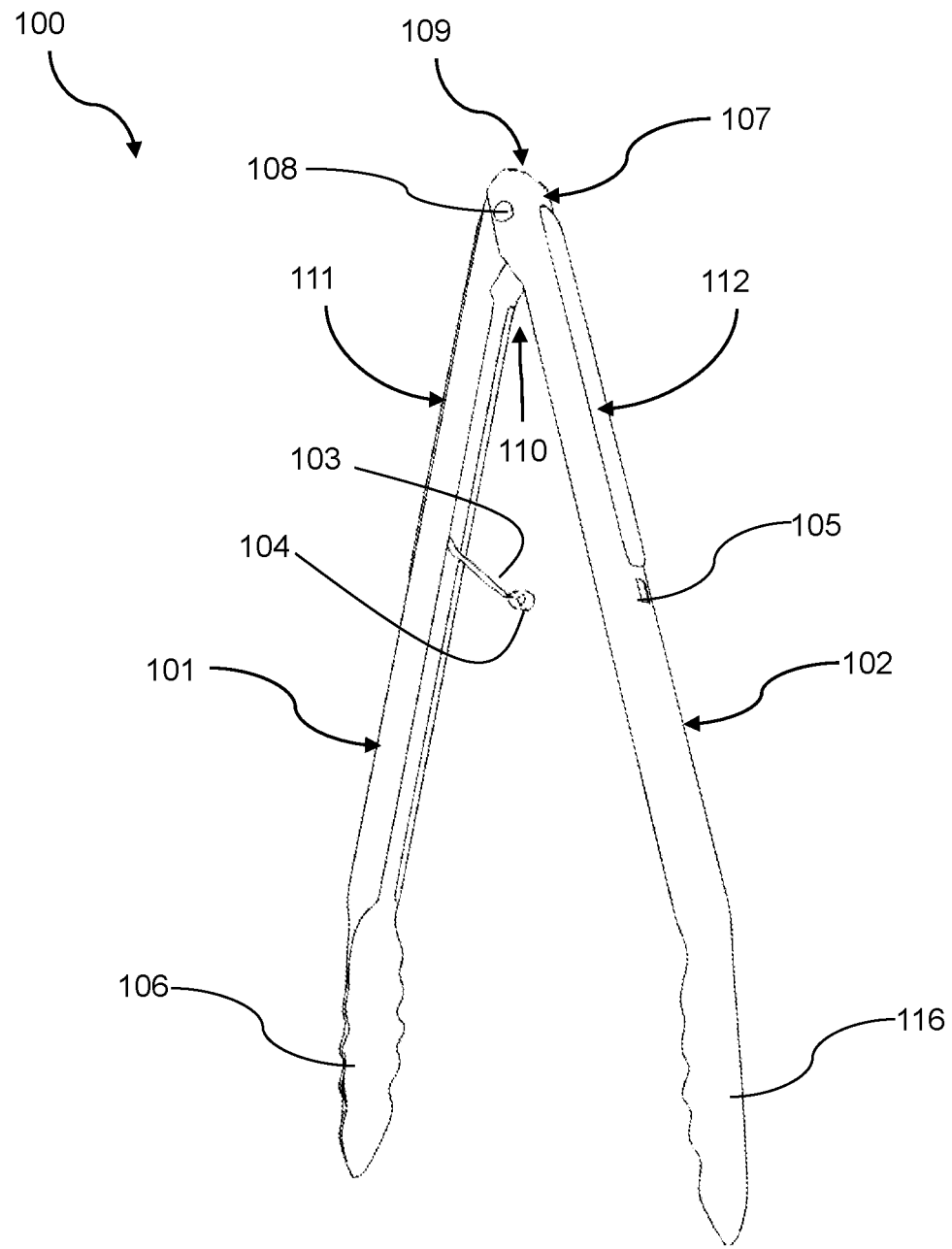
FIG. 1A shows a perspective side view illustrating a single-handed locking tongs in the biased open position according to an embodiment of the present disclosure.

Referring to the drawings, FIGS. 1A-4D illustrate various views of locking tongs according to the present disclosure. FIG. 1A shows an example of single-handed locking tongs 100 configured in a biased open position. Tongs 100 include a first tong arm 101, having a hinge end (i.e., proximal end) and a grasping end (i.e., distal end), connected to a second tong arm 102, having of a hinge end (i.e., proximal end) and a grasping end (i.e., distal end). The tong arms 101 and 102 are connected at a hinge 107 at the hinge end of each of the arms forming a pivot point 109. In this example, the hinge 107 includes a pin 108 positioned at the pivot point 109 that holds together the first tong arm 101 and second tong arm 102.

A tension spring 110, schematically shown in FIG. 1B, is loaded at the pivot point 109 positioned to engage an inner surface of each of first tong arm 101 and second tong arm 102. The first tong arm 101 and second tong arm 102 include grasping heads 106 and 116 respectively located at the grasping ends of each of the tong arms. The tension spring 110 is configured to force grasping heads 106 and 116 of the tong arms to be biased in an open position and thus extend outward and away from each other forming an acute angle there between.

A locking mechanism is formed by a combination of a locking member engaging a receiving aperture. First tong arm 101 includes an elongated locking member 103 mounted on an interior portion of the first tong arm 101 and extends outwardly towards the second tong arm 102. Elongated locking member 103 can be positioned anywhere along the interior surface of the first tong arm 101. In an example, the locking member 103 is positioned at a location that is more than one third but less than half a distance between the hinge 107 and the grasping end 106. In yet another example, the locking member 103 is positioned half way between the hinge 107 and the grasping end 106.

Figures 3A, 3B:
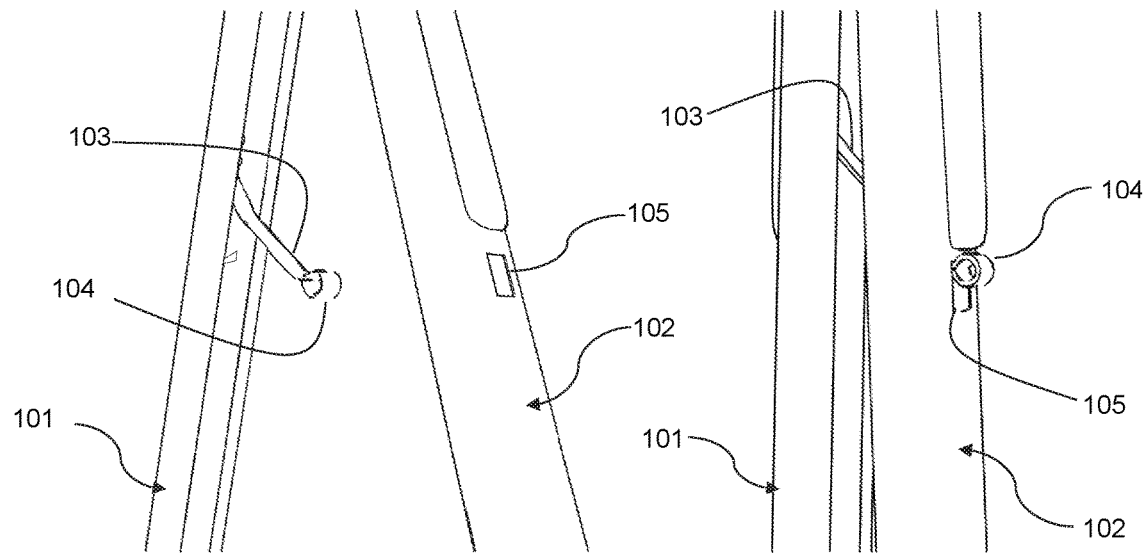
FIGS. 3A and 3B show magnified perspective views of a locking mechanism of the present disclosure in an open and closed position, respectively.

In an example, the locking member 103 defines an elongated body 103 that forms a stop 104 at a disconnected end and angles away from the first tong arm 101. The locking mechanism further includes an aperture 105 formed on the second tong arm 102. The stop 104 is positioned so as to engage with an aperture 105. When the stop 104 passes through the aperture 105, the elongated body 103 and the stop 104 applies pressure to a surface of tong arm 102 and thus holds the tong arms in a locked position, as shown in FIGS. 2A, 2B, and 3B. The elongated locking member defines a length sufficient to effectively overcome the tension spring and hold the tong arms 101 and 102 in a closed position. A closed position can mean that the tong arms 101 and 102 are sufficiently close where the grasping heads are touching or almost touching and the tong arms are almost parallel in a side-by-side configuration as shown in FIG. 2B. The elongated body 103 can extend at an acute angle from the inner surface of the first tong arm 101 towards the grasping end 116 of the second tong arm 102 and results in a locking tension against the second tong arm 102 when engaged through the aperture 105.

In a further example, the stop 104 includes a metal loop end. Aperture 105 is located at a position so as to engage the metal loop end 104 as it passes through the aperture 105 when the first tong arm 101 and second tong arm 102 are pressed towards each other in a closed position. When the metal loop end 104 passes through aperture 105, they combine to form the locking mechanism so that the first tong arm 101 and second tong arm 102 are locked in the closed position. Upon release of the metal loop end 104 from aperture 105, the first tong arm and second tong arm release from the locking mechanism and return to the biased open position, which is the position as shown in FIG. 1. The pressure release of the locking mechanism can be performed manually.

FIGS. 2A-2B illustrate a closed position of the locking tongs 100 from a perspective view in FIG. 2A and from a side view in FIG. 2B. In the closed position, first tong arm 101 is positioned close to and almost parallel with second tong arm 102. The elongated locking member 103 and stop 104 of first tong arm 101 are thereby engaged with aperture 105 of second tong arm 102. In this closed position, the locking mechanism locks the tongs in the closed position without any manual pressure required to hold the tong arms in that position. To release from the closed position into the biased open position, the user applies slight pressure to the metal stop 104 in a direction toward the grasping head 116. This pressure will release the elongated member 103 and stop 104 from the aperture, engaging the tension spring near the pivot point 109 and causing the first tong arm 101 and second tong arm 102 to the biased open position, which is the position as shown in FIGS. 1A and 3A.

FIG. 3A shows an enlarged and magnified view of the unengaged locking mechanism in the biased open position as the first tong arm 101 is spread apart from second tong arm 102 forming an acute angle, i.e., greater than zero degrees but less than 90 degrees. Elongated member 103 and the stop 104 are shown projecting from the inner side of the first tong arm 101 towards aperture 105 similarly located on the second tong arm 102. FIG. 3B shows an enlarged and magnified view of the engaged locking mechanism as the elongated member 103 and stop 104 are engaged with aperture 105, locking first tong arm 101 and second tong arm 102 in the closed position.

In yet a another example, the present disclosure further provides for each tong arm 101 and 102 to further include a gripping feature 111 and 112 formed on an outer surface of the tong arms. The gripping features 111 and 112 can extend along a portion of the outer surface of each tong arm 101 and 102. The gripping features 111 and 112 can provide a textured surface that eases handling and manual control of tongs 100. This aides in the squeezing and release of tongs 100.

Figure 4A:
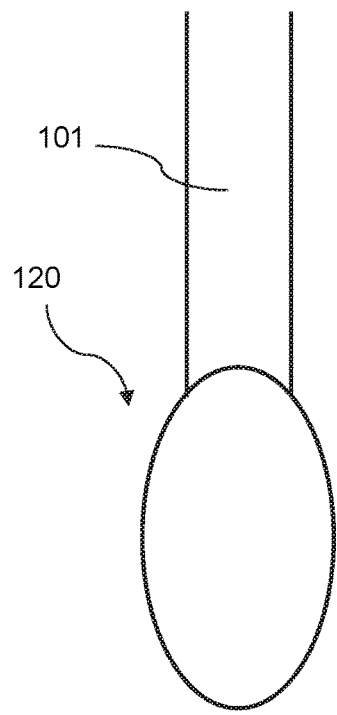
FIG. 4A illustrates an example grasping member of a spoon.
Figure 4B:
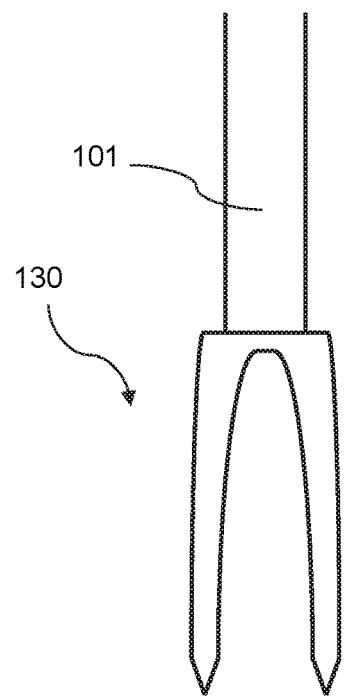
FIG. 4B illustrates an example grasping member of a fork.
Figure 4C:
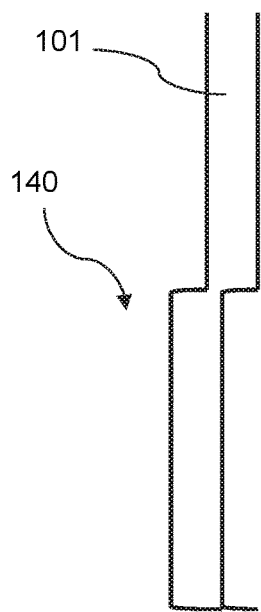
FIG. 4C illustrates an example grasping member of forceps.
Figure 4D:
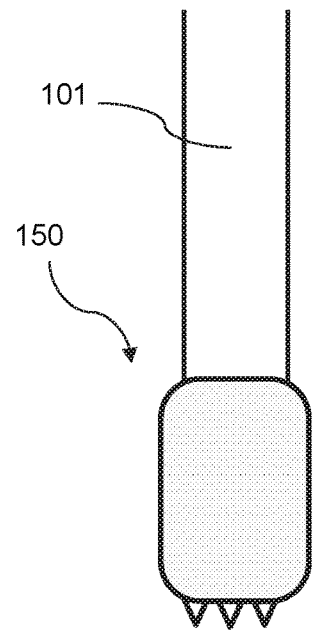
FIG. 4D illustrates an example grasping member of a spork.

Grasping heads 106 and 116 can be configured in a way so as to be sufficient for their intended purpose, for example serving as a cooking or kitchen tool. The ends can be used to assist in cooking and grilling or to help toss a salad or serve food. FIGS. 4A-4D illustrate examples of various exemplary grasping heads that can be used in combination with the locking mechanism of the present disclosure. The grasping ends of each of tong arms 101 and 102 can be identical or different. In FIG. 4A, an exemplary spoon 120 schematic is shown at a grasping end of a tong arm 101. In FIG. 4B, an exemplary fork 130 schematic is shown at a grasping end of a tong arm 101. In FIG. 4C, an exemplary forcep 140 schematic is shown at a grasping end of a tong arm 101. In FIG. 4D, an exemplary spork 150 schematic is shown at a grasping end of a tong arm 101. The grasping heads of tong arms 101 and 102 of an example pair of tongs 100 can be identical or different from each other. For example, one grasping head can be a spoon 120 and the other a fork 130 or both can be spoons 120 or both can be forks 130. Other variations of tong grasping head configurations are within the scope of the present disclosure.

In an example, the grasping heads 106 and 116 are configured to be wider than the tong arms 101 and 102, respectively. In the example of FIGS. 1A-2B, a serrated or "wavy" configuration is shown wherein the grasping heads 106 and 116 are generally convex opened towards each other and curving outward forming a perimeter that defines a serrated geometry.

The embodiments of the disclosure described herein are exemplary, and numerous modifications, variations and rearrangements can be readily envisioned to achieve substantially equivalent results, all of which are intended to be embraced within the spirit and scope of the disclosure. Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application.

What is claimed is:

1. Tongs having a locking mechanism, the tongs comprising:
   (a) a first tong arm and a second tong arm, each of the first and second tong arms having a hinge end and a grasping end, wherein the first and second tong arms are connected at the hinge ends forming a pivot point to allow the first and second tong arms to pivot between an open position and a closed position;
   (b) a tensions spring loaded at the pivot point causing the first and second tong arms to extend out and away from each other in the open position; and
   (c) a locking mechanism compromising an elongated locking member extending from an inner surface of the first tong arm to engage an aperture formed on the second tong arm;
   wherein the elongated locking member engages with the aperture when the first and second tong arms are in a closed position and holds the first and second tong arms in a locked closed position;
   wherein the elongated locking member includes an elongated body and a stop positioned at a disconnected end of the elongated body, the stop is configured for passing through the aperture and directly abutting and holding an outer surface of the second tong arm thereby holding the tong arms in the closed position; and
   wherein, the elongated body extends at an acute angle from the inner surface of the first tong arm towards the aperture of the second tong arm and results in a locking tension directly against the second tong arm when engaged through the aperture.

2. The tongs according to claim 1, wherein the tong arms are operable to pivot about the pivot point to the open position by manually releasing the elongated locking member from the aperture.

3. The tongs of claim 1, wherein the stop includes a metal loop end sized and shaped to engage the outer surface of the second tong arm through the aperture and lock the tong arms in the closed position.

4. The tongs according to claim 1, wherein the stop includes of a ball-point end sized and shaped to engage the outer surface of the second tong arm through the aperture and lock the tong arms in the closed position.

5. The tongs according to claim 1, wherein first tong arm defines a length extending from the hinge end to the grasping end and the elongated locking member is mounted on the inner surface of the first tong arm at a position that is greater than a third of the length of the first tong arm and less than half the length of first tong arm.

6. The tongs according to claim 1, wherein elongated locking member is mounted on the inner surface of the first tong arm at a position halfway between the hinge end and the grasping end of the first tong arm.

7. The tongs according to claim 1, wherein the grasping end of the first tong arm and the grasping end of the second tong arm define identical members selected from the group consisting of spoons, forks, sporks, serrated members, loops, and forceps.

8. The tongs according to claim 1, wherein the grasping end of the first tong arm and the grasping end of the second tong arm are non-identical members selected from the group consisting of a spoon, a fork, a spork, a serrated member, a loop, and a forcep.

9. The tongs according to claim 1, wherein the tong arms are fabricated from metal.

10. The tongs according to claim 1, wherein each tong arm further includes a gripping feature formed on an outer surface of the tong arms.

11. A pair of tongs comprising:
 (a) a first arm and a second arm connected at a pivot point, the first and second arms extending out and away from each other in an open position defining an acute angle there between;
 (b) a first grasping member positioned at a distal end of the first arm and a second grasping member positioned at a distal end of the second arm, wherein the first and second grasping members are operable for grasping food when squeezed together;
 (c) a tension spring positioned at the pivot point holding the first and second arm in an open position; and
 (d) a locking mechanism including: (i) a locking member having an elongated body and forming a stop at an end, the locking member positioned on an inner surface of the first arm and extending at an acute angle towards the second arm, and (ii) a receiving aperture defined on the second arm configured to receive the stop of the locking member;
 wherein the locking member is configured to directly engage an outer surface of the second arm when the stop passes through the receiving aperture and thereby holds the pair of tongs in a closed position; and
 wherein the locking mechanism is operable to allow the pair of tongs to open by releasing the locking member from the receiving aperture;
 wherein, the elongated body extends at an angle from the inner surface of the first arm towards the receiving aperture of the second arm thereby forming a locking tension directly against the second arm when engaged through the receiving aperture.

12. The pair tongs according to claim 11 wherein, the arms are operable to pivot about the pivot point to the open position by manually releasing the elongated locking member from the aperture.

13. The pair of tongs of claim 11, wherein the stop includes a metal loop end sized and shaped to engage the outer surface of the second arm through the aperture and lock the tong arms in the closed position.

14. The pair of tongs according to claim 11, wherein the stop includes of a ballpoint end sized and shaped to engage the outer surface of the second arm through the aperture and lock the arms in the closed position.

15. A method of locking and unlocking a pair of tongs, the method comprising:
 (a) providing a pair of tongs having:
  (i) a first arm and a second arm connected at a pivot point and biased by a tension spring to hold the first and second arms extending out and away from each other in an open position, the open position defining an acute angle there between; and
  (ii) a locking mechanism including a locking member having an elongated body and forming a stop at a disconnected end, the locking member positioned on an inner surface of the first arm and extending at an acute angle towards the second arm, and a receiving aperture defined on the second arm configured to receive the stop of the locking member;
 (b) squeezing the first arm and the second arm together until the locking member directly engages the second arm by passing the stop through the receiving aperture of the second arm; and
 (c) abutting the stop directly against an outer surface of the second arm thereby holding the pair of tongs in a closed and locked position;
 wherein the locking mechanism is operable to allow the pair of tongs to open by releasing the locking member from the receiving aperture.

16. The method of claim 15, wherein the tong arms are unlocked by manually disengaging the locking member from the receiving aperture by a single hand of a user.

* * * * *